(12) United States Patent
Chou et al.

(10) Patent No.: US 9,300,096 B1
(45) Date of Patent: Mar. 29, 2016

(54) POWER CONNECTOR

(71) Applicant: CHIEF LAND ELECTRONIC CO., LTD., New Taipei (TW)

(72) Inventors: Chin-Hsiang Chou, Taipei County (TW); Shin-Tai Ho, Taoyuan (TW); Chi-Tien Shih, Taipei County (TW); Yueh-Lin Yang, Taoyuan (TW)

(73) Assignee: CHIEF LAND ELECTRONIC CO., LTD., New Taipei (TW)

( * ) Notice: Subject to any disclaimer, the term of this patent is extended or adjusted under 35 U.S.C. 154(b) by 0 days.

(21) Appl. No.: 14/660,592

(22) Filed: Mar. 17, 2015

(30) Foreign Application Priority Data

Jan. 16, 2015 (TW) .............................. 104101541 A

(51) Int. Cl.
*H01R 13/02* (2006.01)
*H01R 12/00* (2006.01)
*H01R 24/66* (2011.01)
*H01R 13/73* (2006.01)

(52) U.S. Cl.
CPC ................ *H01R 24/66* (2013.01); *H01R 13/73* (2013.01)

(58) Field of Classification Search
CPC .... H01R 23/7073; H01R 13/04; H01R 13/03; G06F 1/1632
USPC ........................... 439/733.1, 886; 361/679.41
See application file for complete search history.

(56) References Cited

U.S. PATENT DOCUMENTS

| | | | |
|---|---|---|---|
| 5,452,180 A * | 9/1995 | Register ................ | G06F 1/1632 361/679.44 |
| 8,264,829 B2 * | 9/2012 | Moser ................... | G06F 1/1616 345/163 |
| 8,878,067 B2 * | 11/2014 | Tamura .............. | B23K 26/0621 174/126.2 |
| 8,964,372 B2 * | 2/2015 | Morton ................. | G06F 1/1632 439/688 |
| 9,093,803 B2 * | 7/2015 | SooHoo ................ | G06F 1/1626 |
| 2008/0165492 A1 * | 7/2008 | Ward .................... | G06F 1/1632 361/679.37 |
| 2013/0335914 A1 * | 12/2013 | Lee ....................... | G06F 1/1632 361/679.41 |

* cited by examiner

*Primary Examiner* — Briggitte R Hammond
(74) *Attorney, Agent, or Firm* — Li & Cai Intellectual Property (USA) Office

(57) ABSTRACT

A power connector includes a conductive module and an insulating member. The conductive module includes a metal seat and a conductive pin at least partially protruding from the metal seat. The metal seat is configured to be installed on a first electronic device. The conductive pin is configured to insertably connect to a second electronic device. The insulating member covers part of the outer surface of the conductive module, and the conductive module has a contact portion exposed from the insulating member. The contact portion and the conductive pin are provided with electrical connection. The contact portion is configured to electrically connect to the first electronic device when the metal seat is installed on the first electronic device. The conductive pin is configured to electrically connect to the second electronic device when inserting into the second electronic device.

10 Claims, 10 Drawing Sheets

POWER CONNECTOR

1. FIELD OF THE INVENTION

The instant invention relates to a connector; in particular, to a power connector for transmitting electrical power.

2. DESCRIPTION OF RELATED ART

The conventional power connector is mounted on a first electronic device for inserting into a second electronic device. The conventional power connector is covered by a plastic case and is mounted on a carrying seat, thus the electrical power flowing through the conventional power connector cannot enter into the carrying seat by isolating the plastic case so that users are prevented from getting electrically shocked and damages to the first and second electronic devices due to current leakage from the conventional connector.

However, when the second electronic device is combined with the conventional power connector, both the plastic case and the carrying seat provide weak support, the plastic case and the carrying seat need to load the weight of the second electronic device and need to load the impact force between the second electronic device and the conventional power connector during the inserting process. Accordingly, a metal supporting structure, which is provided without any electrical communication function, needs to be added on the carrying seat for providing support. Thus, under the premise to avoid current leakage from the power connector and to prevent users from getting electrically shocked, by proper arrangement of an insulating member with a conductive module to develop a safe and good structural support power connector while providing power transmission function is an issue that one skilled in the art is concerned with.

To achieve the abovementioned improvement, the inventors strive via industrial experience and academic research to present the instant disclosure, which can provide additional improvement as mentioned above.

SUMMARY OF THE INVENTION

The instant disclosure provides a power connector for solving the problem generated from the conventional power connector.

The instant disclosure provides a power connector, comprising: a conductive module having a metal seat and a conductive pin at least partially protruding from the metal seat, wherein the metal seat is configured for installing on a first electronic device, the conductive pin is configured for detachably inserting into a second electronic device; and an insulating member covering part of an outer surface of the conductive module, the outer surface of the conductive module has a contact area exposed from the insulating member, the contact area is electrically communicable with the conductive pin, wherein when the metal seat is installed on the first electronic device, the contact area of the conductive module is configured for electrically connecting to the first electronic device, and when the conductive pin is inserted into the second electronic device, the conductive pin is configured for electrically connecting to the second electronic device.

Preferably, the metal seat is integrally formed with the conductive pin, the conductive pin protrudes from the metal seat, and at least part of the outer surface of the metal seat is covered by the insulating member.

Preferably, the insulating member is disposed between the conductive pin and the metal seat to attach the conductive pin and the metal seat and to electrically isolate the conductive pin from the metal seat; and wherein the contact area is arranged on the conductive pin.

In summary, the power connector of the instant disclosure is provided with the above cooperation of the conductive module and the insulating member, and the power connector can be electrically isolated from the first electronic device, such that the first electronic device is provided without structure, material, or circuit about electrical isolation. Accordingly, under the premise of avoiding current leakage of the metal seat and the user getting electrically shocked, the power connector not only has power transmission function but also provides stronger structural support by the metal seat and the arrangement of the insulating member and the conductive module.

In order to further appreciate the characteristics and technical contents of the instant invention, references are hereunder made to the detailed descriptions and appended drawings in connection with the instant invention. However, the appended drawings are merely shown for exemplary purposes, rather than being used to restrict the scope of the instant invention.

DETAILED DESCRIPTION OF THE PREFERRED EMBODIMENTS

First Embodiment

Figure 1A:
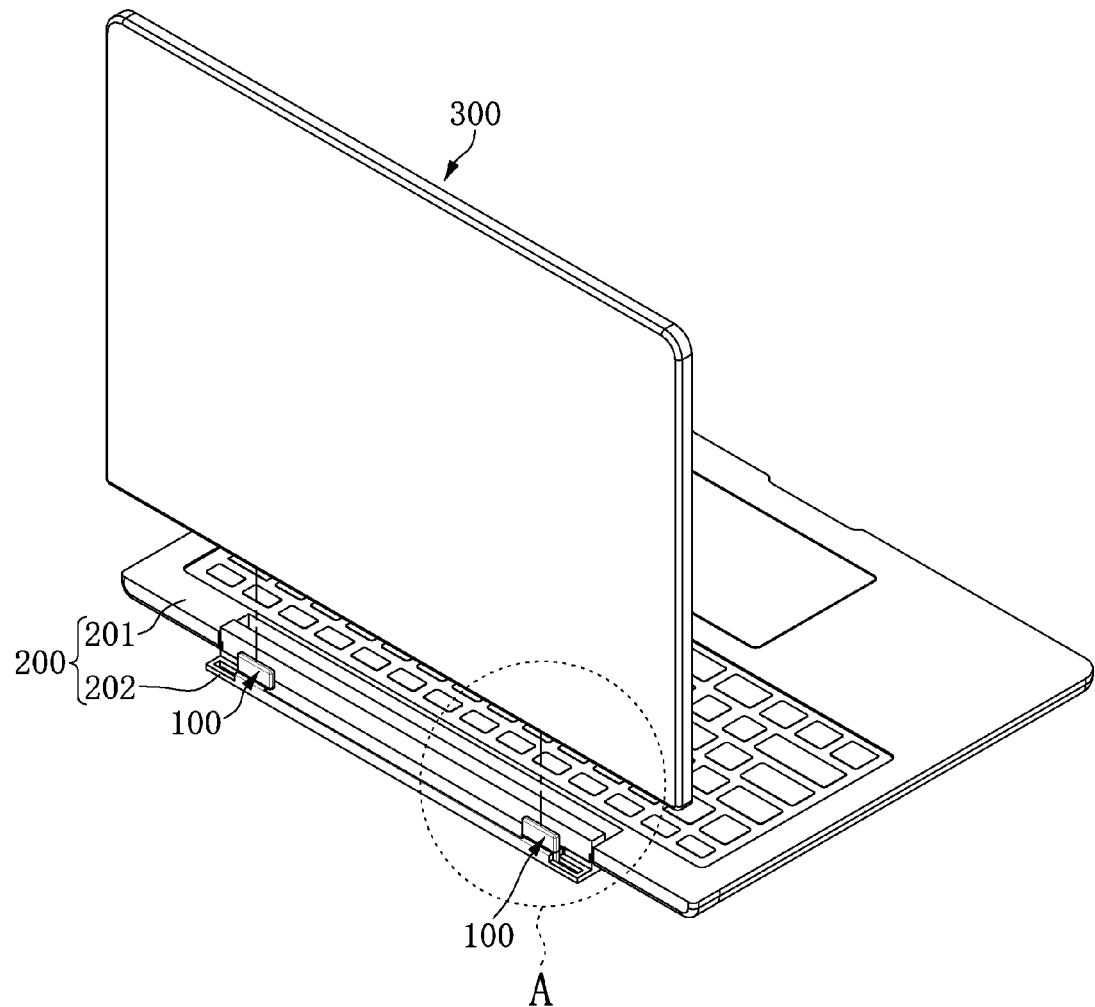
FIG. 1A is a perspective view showing a power connector of an embodiment installed on a first electronic device and detachably inserting into a second electronic device.
Figure 2:
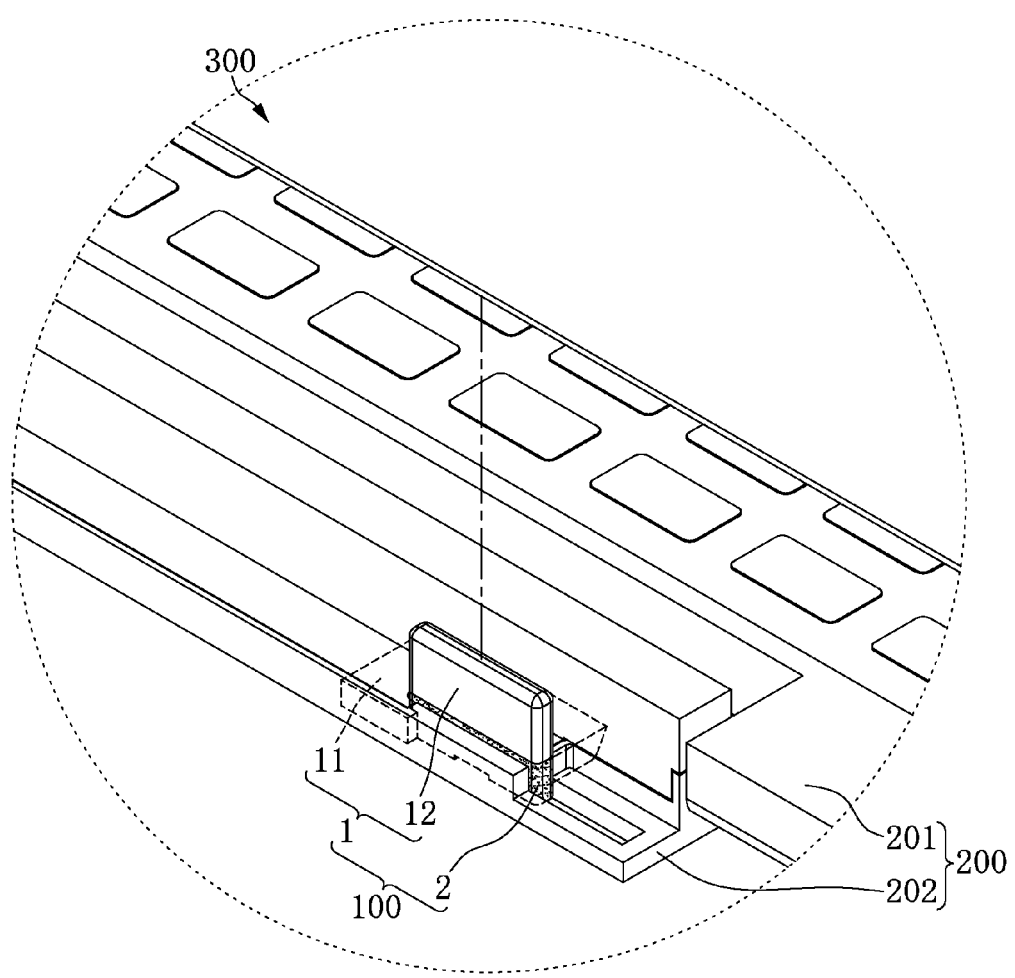
FIG. 2 is an enlarged view of the power connector as shown in FIG. 1A.

Please refer to FIGS. 1A and 2, which show a first embodiment of the instant disclosure. References are hereunder made to the detailed descriptions and appended drawings in connection with the instant invention. However, the appended drawings are merely shown for exemplary purposes, rather than being used to restrict the scope of the instant invention.

The instant embodiment provides a power connector 100 for installing on a first electronic device 200 and detachably inserting into a second electronic device 300. When the power connector 100 is installed on the first electronic device 200 and is inserted into the second electronic device 300, the first and second electronic 200, 300 establish a power transmission path via the power connector 100. Moreover, the first electronic device 200 in the instant embodiment is a keyboard module for example, and the second electronic device 300 is a display module, but the first and second electronic devices 200, 300 are not limited thereto.

Figure 3:
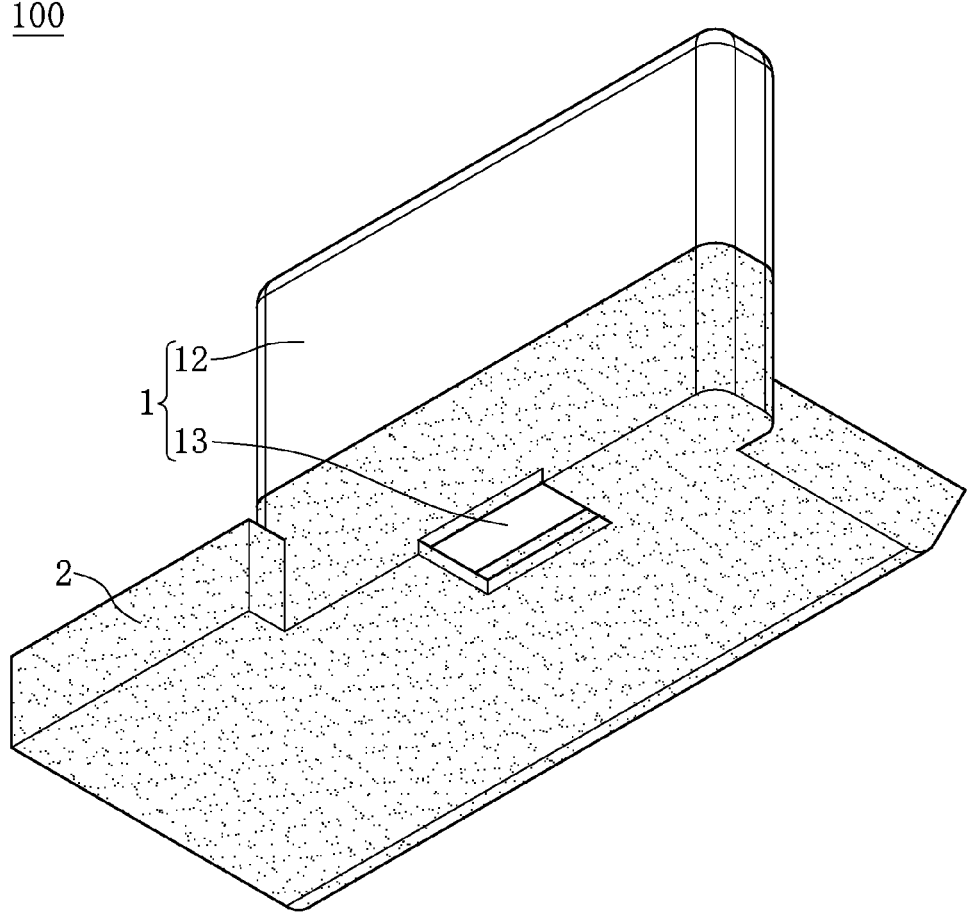
FIG. 3 is a perspective view showing the power connector as shown in FIG. 1A.

The power connector 100 includes a conductive module 1 and an insulating member 2 covering part of an outer surface of the conductive module 1, and the outer surface of the conductive module 1 has a contact area 13 not covered by the insulating member 2 (as shown in FIG. 3). The following description discloses the construction of the conductive module 1, and then discloses the relationship of the conductive module 1 and the insulating member 2.

The conductive module 1 includes a metal seat 11 and a conductive pin 12 protruding from the metal seat 11. The metal seat 11 is configured for installing on the first electronic device 200, and the connection of the metal seat 11 and the first electronic device 200 is a structural connection without any electrical communication. The conductive pin 12 is configured for detachably inserting into the second electronic device 300.

Figure 1B:
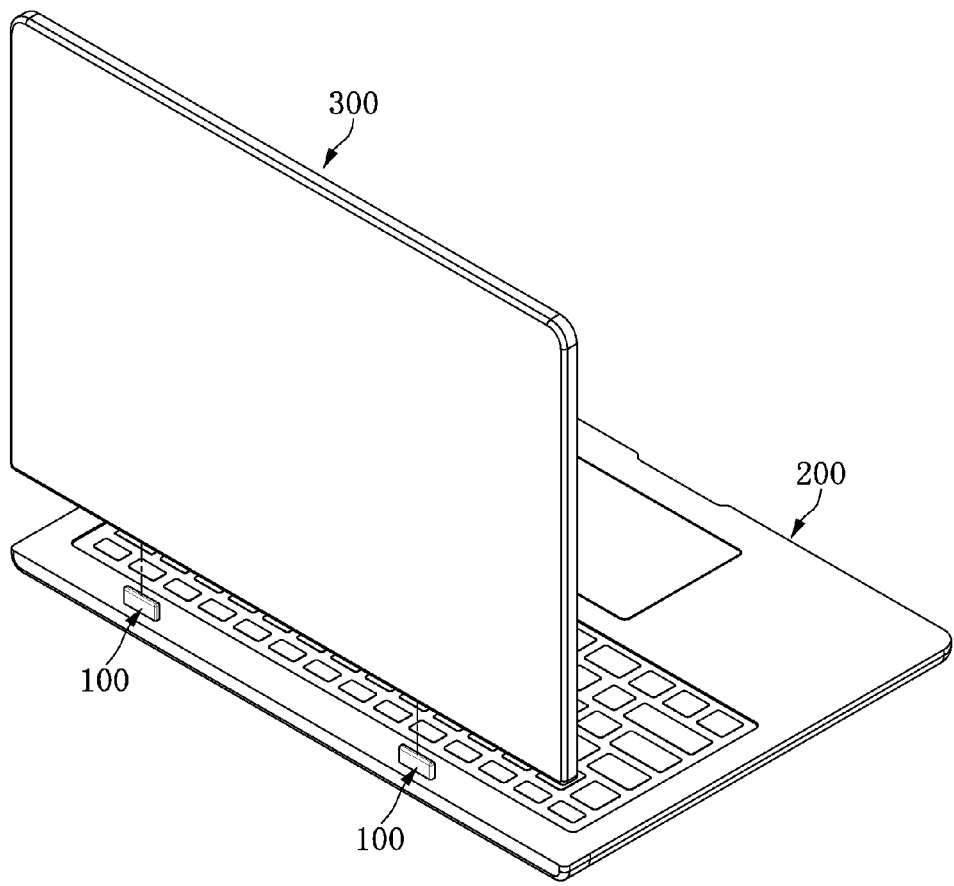
FIG. 1B is a perspective view showing the power connector of the instant disclosure applied for another first electronic device.

In order to clearly explain the instant embodiment, the following description and drawings only disclose a single conductive pin 12 and the corresponding metal seat 11. Moreover, the first electronic device 200, as shown in FIGS. 1A and 1n the instant embodiment, includes a main portion 201 and a connecting case 202 that is disposed on the main portion 201. The metal seat 11 is installed on the inner surface of the connecting case 202 (as shown in FIG. 1A), but the first electronic device 200 is not limited thereto. For example, the first electronic device 200 can be provided as shown in FIG. 1B, and the metal seat 11 is directly installed in the first electronic device 200.

Figure 4:
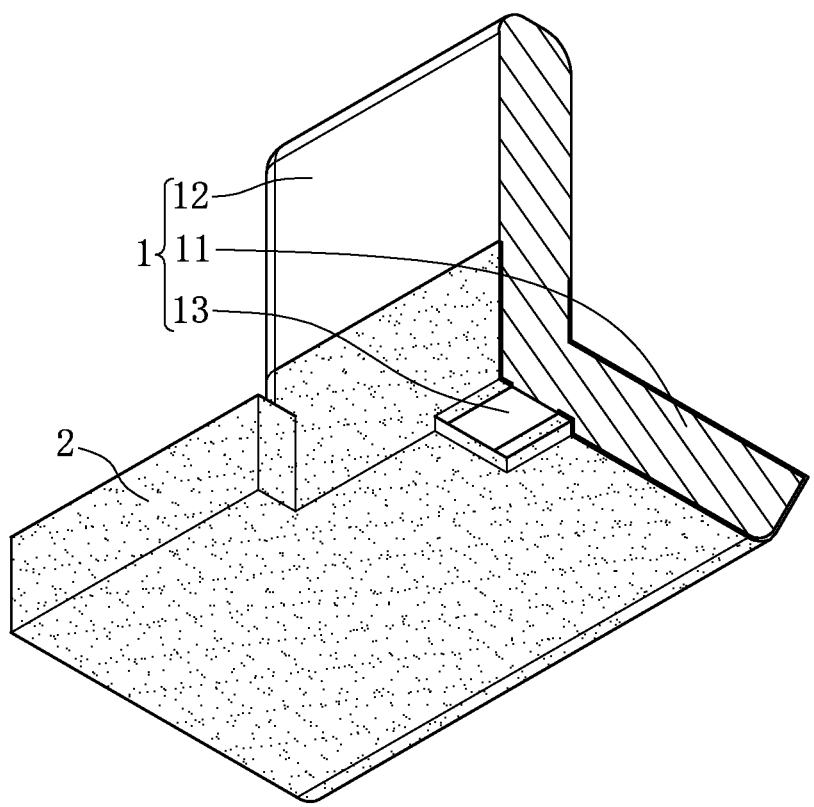
FIG. 4 is a cross-sectional view of FIG. 3.
Figure 5:
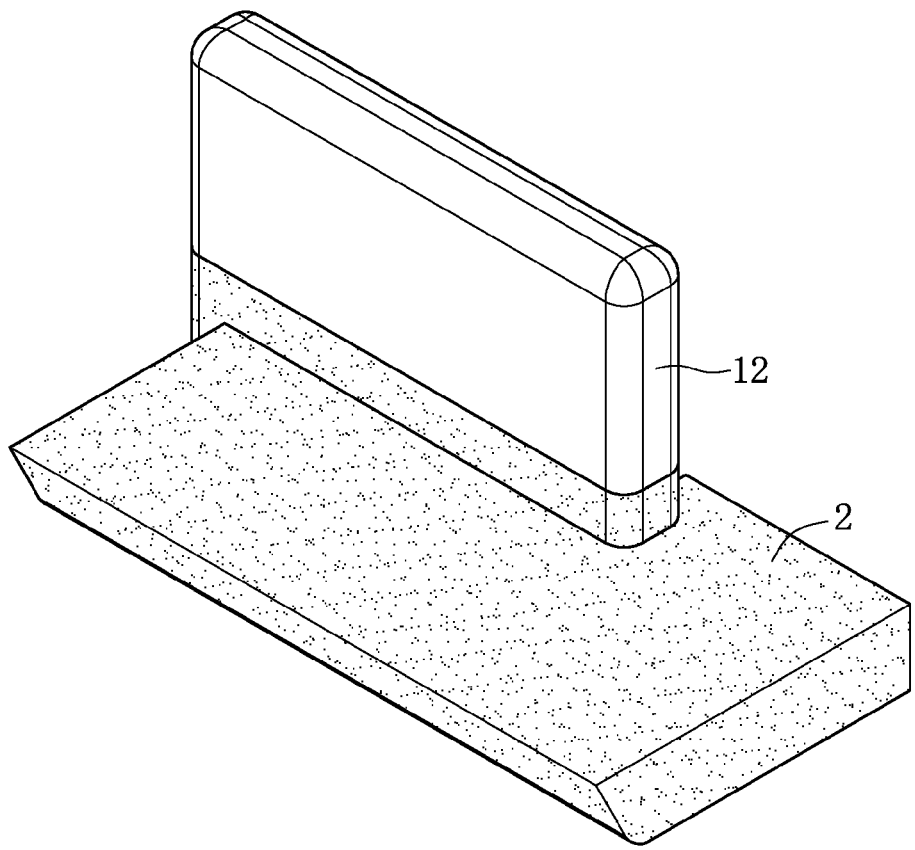
FIG. 5 is a perspective view showing FIG. 3 from another observing angle.
Figure 6:
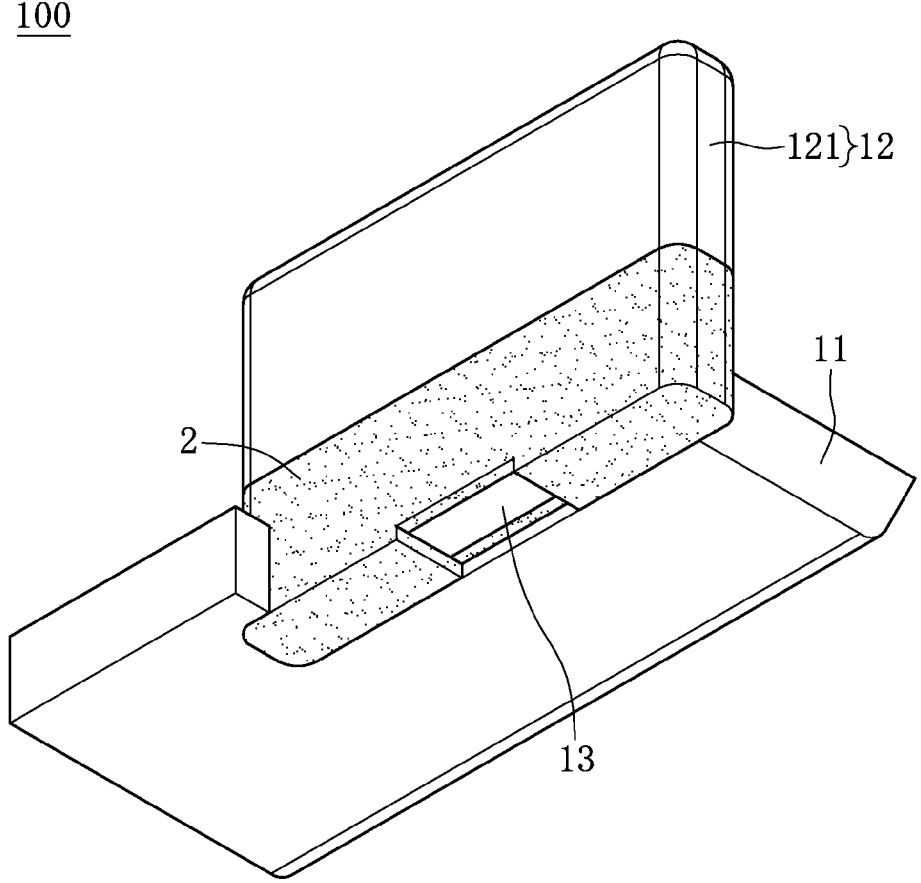
FIG. 6 is a perspective view showing the power connector of another embodiment.

Please refer to FIGS. 3 through 5. The metal seat 11 in the instant embodiment is integrally connected to the conductive pin 12. The "integrally connected" means that the metal seat 11 and the conductive pin 12 can be connected by welding manner, or that the metal seat 11 and the conductive pin 12 can be formed by machining one metal block. Specifically, in the instant embodiment, the metal seat 11 is approximately plate-like, and the conductive pin 12 is a pillar having rectangular cross-section. The conductive pin 12 is perpendicularly and integrally extended from the main surface of the metal seat 11.

Moreover, the contact area 13 in the instant embodiment is arranged on the metal seat 11, and the contact area 13 is electrically communicable with the conductive pin 12 via the metal seat 11. When the metal seat 11 is installed on the connecting case 202 of the first electronic device 200, the contact area 13 of the conductive module 1 is configured for electrically connecting to the main portion 201 of the first electronic device 200 by a cable (not shown) or other electrically connecting manner, thus establishing an electrical connection between the conductive pin 12 and the main portion 201 of the first electronic device 200.

However, the connecting case 202 can be made by metal, so an insulating means should be provided between the metal seat 11 and the connecting case 202 to prevent the user from getting electrically shocked and to prevent damages to the first and second electronic devices 200, 300 that result from current leakage of the metal seat 11 when the user touches the surface of the connecting case 202. Specifically, the contact area 13 in the instant embodiment is arranged on an end surface of the metal seat 11 away from the conductive pin 12 (i.e., the bottom surface of the metal seat 11 as shown in FIG. 4), such that the outer surface of the metal seat 11 excluding the contact area 13 is approximately covered by the insulating member 2 to avoid current leakage from the metal seat 11, thus preventing the user from getting electrically shocked and preventing damages to the first and second electronic devices 200, 300 that result from current leakage of the metal seat 11. The insulating member 2 in the instant embodiment is a film that covers the outer surface of the conductive module 1, but the insulating member 2 is not limited thereto.

It should be noted that the outer surface of the metal seat 11 excluding the contact area 13 in the instant embodiment is approximately covered by the insulating member 2, in which it means that the outer surface of the metal seat 11 excluding the contact area 13 is "entirely" covered by the insulating member 2, or the outer surface of the metal seat 11 is covered by the insulating member 2 except for a portion not being in contact with the connecting case 202 and the user (i.e., a portion of the top surface of the metal seat 11 adjacent to the conductive pin 12).

Besides, the position of the contact area 13 in the instant embodiment is arranged on the end surface of the metal seat 11 away from the conductive pin 12, but the position of the contact area 13 can be changed according to the designer's request and is not limited to the instant embodiment. For example, the contact area 13 can be arranged on the top surface or the side surface of the metal seat 11 (not shown).

Moreover, the contact area 13 can be arranged on the conductive pin 12. When the metal seat 11 is installed on the connecting case 202 of the first electronic device 200, the contact area 13 is configured for electrically connecting to the main portion 201 of the first electronic device 200 by a cable (not shown) or other electrically connecting manner. When the contact area 13 is arranged on the conductive pin 12, the outer surface of the metal seat 11 is approximately covered by the insulating member 2 to electrically isolate the metal seat 11 from the connecting case 202, thus preventing the user from getting electrically shocked and preventing damages to the first and second electronic devices 200, 300 that result from current leakage of the metal seat 11.

Based on the above construction of the power connector 100, when the conductive pin 12 is connected to the second electronic device 300, the conductive pin 12 and the second electronic device 300 establish a power transmission path suitable to transmit electrical power, so that the first electronic device 200 and the second electronic device 300 can transmit electrical power with each other by the power transmission path, and the contact area 13 is electrically communicable with the conductive pin 12. Thus, based on the cooperation of the conductive module 1 and the insulating member 2, the power connector 100 can be electrically isolated from the connecting case 202 of the first electronic device 200, such that the first electronic device 200 is provided without structure, material, or circuit about electrical isolation. Accordingly, under the premise to prevent current leakage of the metal seat 11 and the user getting electrically shocked, the power connector 100 not only has power transmission function but also provides stronger structural support by the metal seat 11 and the arrangement of the insulating member 2 and the conductive module 1.

Second Embodiment

Please refer to FIGS. 6 through 9, which show a second embodiment of the instant disclosure. The instant embodiment is similar to the first embodiment, so the identical features of the two embodiments are not disclosed again. The difference between the two embodiments is disclosed as follows. The instant embodiment only discloses a single conductive pin 12 and the corresponding metal seat 11. Specifically, the first electronic device 200 in the instant embodiment includes a main portion 201 and a connecting case 202 disposed on the main portion 201, and the metal seat 11 is installed on the inner surface of the connecting case 202 (as shown in FIG. 1A), but the first electronic device 200 is not limited thereto.

Figure 7:
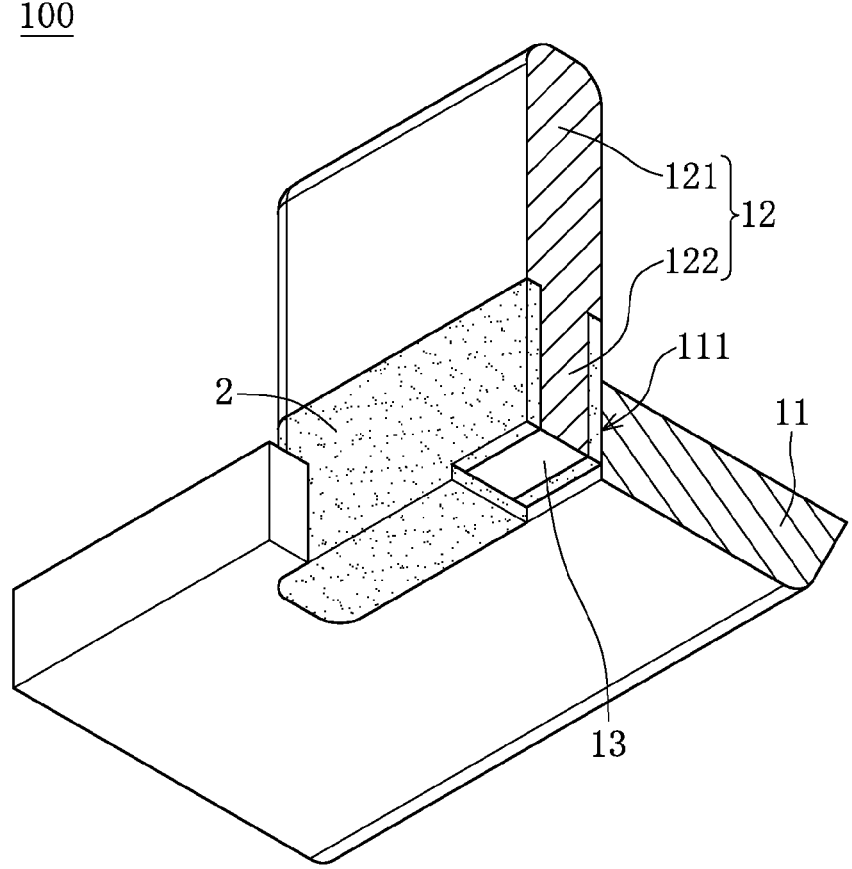
FIG. 7 is a cross-sectional view of FIG. 6.
Figure 8:
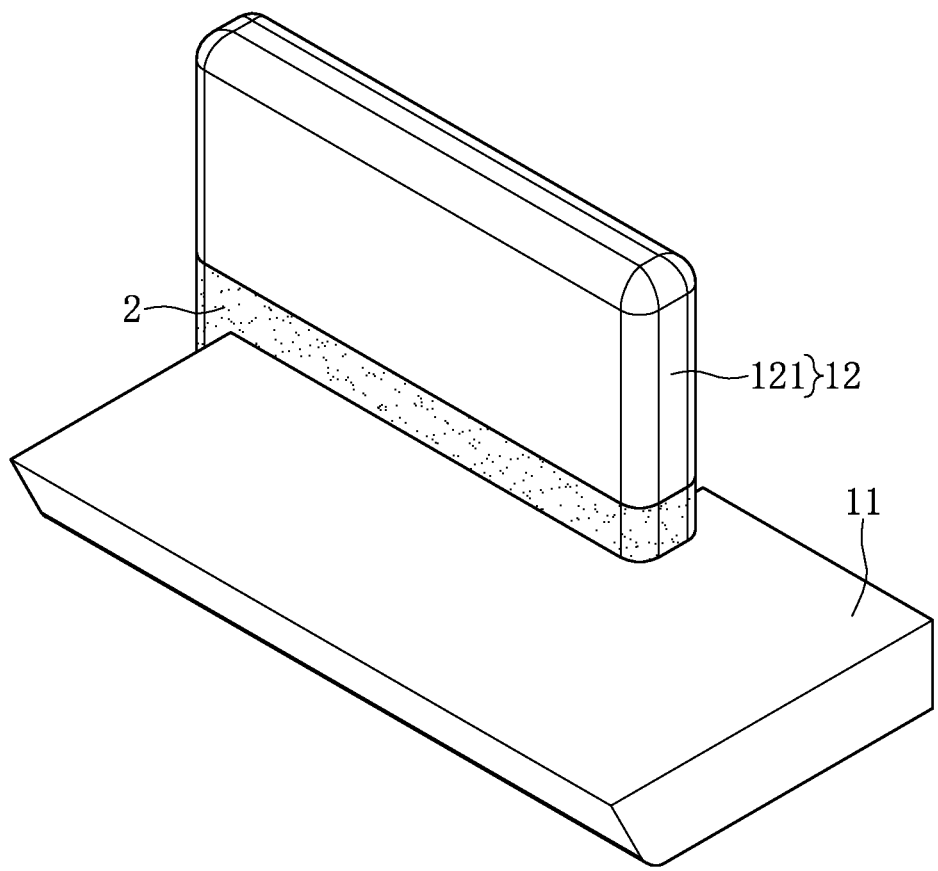
FIG. 8 is a perspective view showing FIG. 6 from another observing angle.
Figure 9:
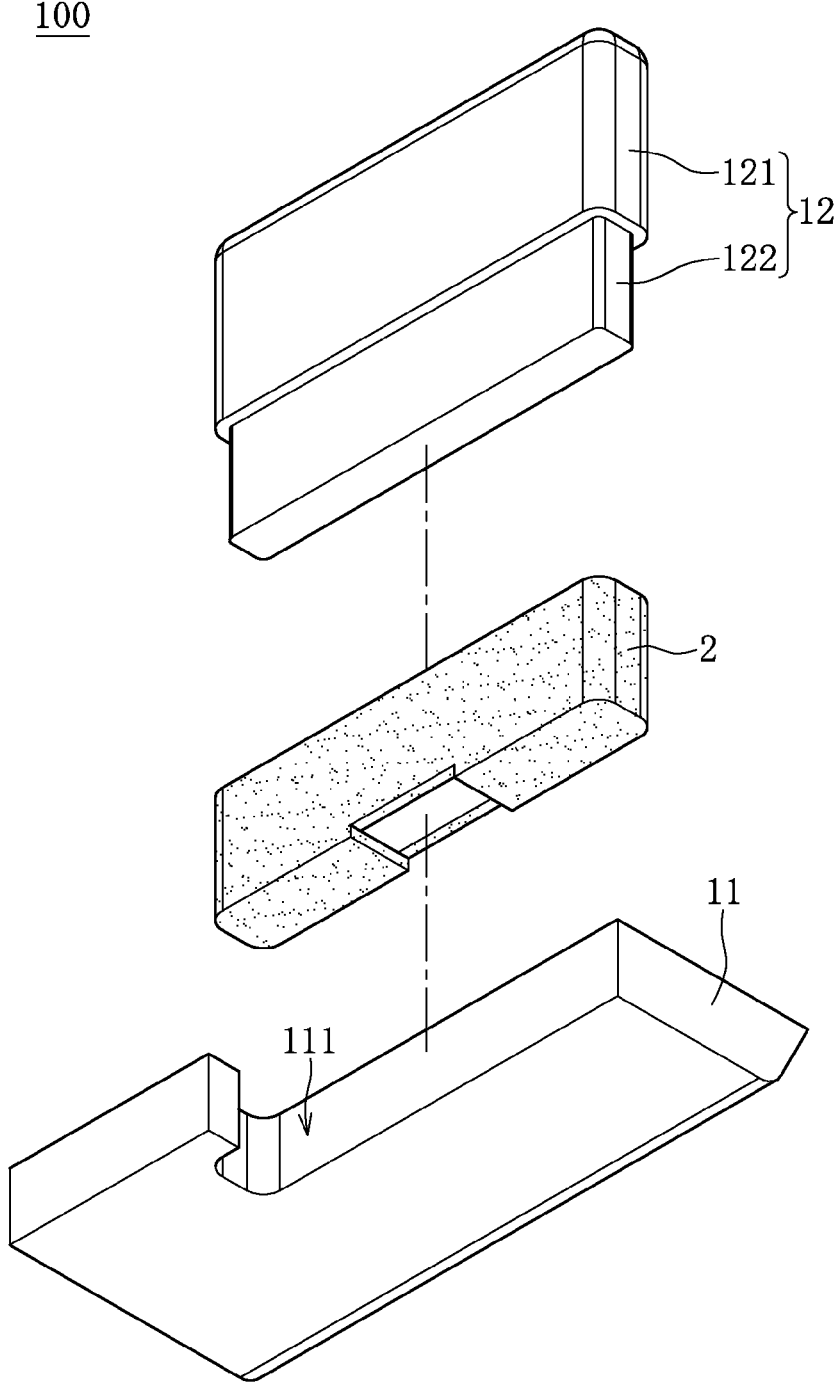
FIG. 9 is an exploded view of FIG. 6.

As shown in FIGS. 7 and 9, the metal seat 11 and the conductive pin 12 in the instant embodiment are two independent components. The metal seat 11 is approximately plate-like. The metal seat 11 has an accommodating trough 111 penetrating two opposite main surfaces thereof (i.e., the top and bottom surfaces of the metal seat 11 as shown in FIG. 9), and the inner wall of the accommodating trough 111 is approximately J-shaped, but is not limited thereto. The conductive pin 12 has a protruding portion 121 and an extending portion 122 integrally extended from the protruding portion 121. The protruding portion 121 is a pillar having a rectangular cross-section, and the extending portion 122 is also a pillar having a rectangular cross-section that is smaller than the cross-section of the protruding portion 121. The length of the extending portion 122 is greater than the depth of the accommodating trough 111 of the metal seat 11 (such as the thickness of the metal seat 11).

The insulating member 2 is disposed between the conductive pin 12 and the metal seat 11 to connect the conductive pin 12 and the metal seat 11, thus electrically isolating the conductive pin 12 from the metal seat 11. Specifically, the extending portion 122 of the conductive pin 12 couples through the accommodating trough 111 of the metal seat 11, and the insulating member 2 is disposed between the extending portion 122 and the accommodating trough 111 in order to connect the extending portion 122 and the accommodating trough 111 by covering two adjacent surfaces of the extending portion 122 and the accommodating trough 111 (i.e., the side surface of the extending portion 122 and the inner wall of the accommodating trough 111 as shown in FIG. 7), thus electrically isolating the extending portion 122 of the conductive pin 12 from the metal seat 11. Accordingly, the extending portion 122 of the conductive pin 12 is electrically isolated from the connecting case 202. Moreover, the protruding portion 121 protrudes from the metal seat 11 for detachably inserting into the second electronic device 300.

The contact area 13 in the instant embodiment is arranged on the extending portion 122 of the conductive pin 12, and the contact area 13 is electrically communicable with the protruding portion 121 via the extending portion 122. When the metal seat 11 is installed on the connecting case 202 of the first electronic device 200, the contact area 13 is configured for electrically connecting to the main portion 201 of the first electronic device 200 by a cable (not shown) or other electrically connecting manner, thus establishing an electrical connection between the extending portion 121 and the main portion 201 of the first electronic device 200.

Specifically, the contact area 13 in the instant embodiment is arranged on an end surface of the extending portion 122 away from the protruding portion 121 (i.e., the bottom surface of the extending portion 122 as shown in FIG. 7), and the outer surface of the extending portion 122 excluding the contact area 13 is approximately covered by the insulating member 2. A portion of the insulating member 2 covering the side surface of the extending portion 122 is approximately flushed with the side surface of the protruding portion 121 as shown in FIG. 7. A portion of the insulating member 2 covering the bottom surface of the extending portion 122 is approximately flushed with the adjacent surface, or the end surface of the metal seat 11 (i.e., the bottom surface of the metal seat 11 as shown in FIG. 7).

It should be noted that the outer surface of the extending portion 122 excluding the contact area 13 in the instant embodiment is approximately covered by the insulating member 2, in which it means that the outer surface of the extending portion 122 excluding the contact area 13 is "entirely" covered by the insulating member 2, or the outer surface of the extending portion 122 covered by the insulating member 2 excludes a portion, in which that portion is not in contact with the connecting case 202 and the user (i.e., a portion of the top surface of the extending portion 122 protruding from the metal seat 11 and adjacent to the protruding portion 121).

Besides, the position of the contact area 13 in the instant embodiment is arranged on the end surface of the extending portion 122 away from the protruding portion 121, but the position of the contact area 13 can be changed according to the designer's request and is not limited to the instant embodiment. For example, the contact area 13 can be arranged on the side surface of the extending portion 122 (not shown).

Moreover, the contact area 13 can be arranged on the protruding portion 121. When the metal seat 11 is installed on the connecting case 202 of the first electronic device 200, the contact area 13 is configured for electrically connecting to the main portion 201 of the first electronic device 200 by a cable (not shown) or other electrically connecting manner. When the contact area 13 is arranged on the protruding portion 121, the outer surface of the extending portion 122 is approximately covered by the insulating member 2 to electrically isolate the conductive pin 12 from the connecting case 202, thus preventing the user from getting electrically shocked and preventing damages to the first and second electronic devices 200, 300 that result from current leakage of the metal seat 11.

Based on the above construction of the power connector 100, when the conductive pin 12 is connected to the second electronic device 300, the conductive pin 12 and the second electronic device 300 establish a power transmission path suitable to transmit electrical power, so that the first electronic device 200 and the second electronic device 300 can transmit electrical power with each other by the power transmission path while the contact area 13 is electrically communicable with the protruding portion 121 of the conductive pin 12. Thus, based on the cooperation of the conductive module 1 and the insulating member 2, the power connector 100 can be electrically isolated from the connecting case 202 of the first electronic device 200, such that the first electronic device 200 is provided without structure, material, or circuit about electrical isolation. Accordingly, under the premise to prevent current leakage of the metal seat 11 and the user from getting electrically shocked, the power connector 100 not only has power transmission function but also provides stronger structural support by the metal seat 11 and the arrangement of the insulating member 2 and the conductive module 1.

The Possible Effect of the Instant Disclosure

In summary, the power connector of the instant disclosure is provided with the above cooperation of the conductive module and the insulating member, the power connector can be electrically isolated from the first electronic device, such that the first electronic device is provided without structure, material, or circuit about electrical isolation. Accordingly, under the premise to prevent current leakage of the metal seat and the user from getting electrically shocked, the power connector not only has power transmission function but also provides stronger structural support by the metal seat and the arrangement of the insulating member and the conductive module.

The descriptions illustrated supra set forth simply the preferred embodiments of the instant invention; however, the characteristics of the instant invention are by no means restricted thereto. All changes, alternations, or modifications conveniently considered by those skilled in the art are deemed to be encompassed within the scope of the instant invention delineated by the following claims.

What is claimed is:

1. A power connector, comprising:
   a conductive module having a metal seat and a conductive pin at least partially protruding from the metal seat, wherein the metal seat is configured for installing on a first electronic device, the conductive pin is configured for detachably inserting into a second electronic device; and
   an insulating member covering part of an outer surface of the conductive module, wherein the outer surface of the conductive module has a contact area exposed from the insulating member, the contact area is electrically communicable with the conductive pin,
   wherein when the metal seat is installed on the first electronic device, the contact area of the conductive module is configured for electrically connecting to the first electronic device, and when the conductive pin is inserted into the second electronic device, the conductive pin is configured for electrically connecting to the second electronic device.

2. The power connector as claimed in claim 1, wherein the metal seat is integrally formed with the conductive pin, the conductive pin protrudes from the metal seat, and at least part of the outer surface of the metal seat is covered by the insulating member.

3. The power connector as claimed in claim 2, wherein the contact area is arranged on the metal seat, and the outer surface of the metal seat excluding the contact area is substantially covered by the insulating member.

4. The power connector as claimed in claim 2, wherein the contact area is arranged on the conductive pin, and the outer surface of the metal seat is substantially covered by the insulating member.

5. The power connector as claimed in claim 1, wherein the insulating member is disposed between the conductive pin and the metal seat to connect the conductive pin and the metal seat and to electrically isolate the conductive pin from the metal seat; and wherein the contact area is arranged on the conductive pin.

6. The power connector as claimed in claim 5, wherein the conductive pin has a protruding portion and an extending portion integrally formed with and extended from the protruding portion, the metal seat has an accommodating trough, the extending portion of the conductive pin couples through the accommodating trough of the metal seat, and the protruding portion protrudes from the metal seat to detachably insert into the second electronic device; wherein the insulating member is disposed between the extending portion and the accommodating trough to connect the extending portion and the accommodating trough by covering two adjacent surfaces of the extending portion and the accommodating trough, thereby electrically isolating the extending portion of the conductive pin from the metal seat.

7. The power connector as claimed in claim 6, wherein the contact area is arranged on the protruding portion of the conductive pin.

8. The power connector as claimed in claim 6, wherein the contact area is arranged on the extending portion of the conductive pin.

9. The power connector as claimed in claim 8, wherein the contact area is arranged on an end surface of the extending portion away from the protruding portion, and the outer surface of the extending portion excluding the contact area is substantially covered by the insulating member.

10. The power connector as claimed in claim 1, wherein the metal seat is compatible with a keyboard module installed thereon, and the conductive pin is compatible with a display module.

* * * * *